US008941594B2

(12) United States Patent
Rehbock (10) Patent No.: US 8,941,594 B2
(45) Date of Patent: Jan. 27, 2015

(54) INTERFACE, CIRCUIT AND METHOD FOR INTERFACING WITH AN ELECTRONIC DEVICE

(75) Inventor: William E. Rehbock, Santa Clara, CA (US)

(73) Assignee: Nvidia Corporation, Santa Clara, CA (US)

(*) Notice: Subject to any disclaimer, the term of this patent is extended or adjusted under 35 U.S.C. 154(b) by 2047 days.

(21) Appl. No.: 10/956,682

(22) Filed: Oct. 1, 2004

(65) Prior Publication Data

US 2006/0071908 A1  Apr. 6, 2006

(51) Int. Cl.
*G06F 3/02* (2006.01)
*G06F 3/023* (2006.01)
*A63F 13/90* (2014.01)
*H04M 1/23* (2006.01)

(52) U.S. Cl.
CPC .............. *G06F 3/0235* (2013.01); *A63F 13/08* (2013.01); *G06F 3/0205* (2013.01); *A63F 2300/204* (2013.01); *A63F 2300/406* (2013.01); *H04M 1/233* (2013.01)
USPC ........... 345/169; 345/168; 455/566; 200/314; 200/345

(58) Field of Classification Search
USPC ............ 345/169, 168; 455/566; 200/314, 345
See application file for complete search history.

(56) References Cited

U.S. PATENT DOCUMENTS

| 3,381,276 A | 4/1968 | James |
| 4,687,200 A | 8/1987 | Shirai |
| 4,786,768 A * | 11/1988 | Langewis et al. ............ 200/6 A |
| 5,874,906 A | 2/1999 | Willner et al. |
| 6,785,387 B1 | 8/2004 | Albrecht et al. |
| 6,789,030 B1 | 9/2004 | Coyle et al. |
| 7,203,908 B1 * | 4/2007 | Nakajima et al. ............. 715/758 |
| 2001/0027123 A1 * | 10/2001 | Ishigaki ........................ 455/566 |
| 2002/0142738 A1 | 10/2002 | Jambie |
| 2003/0018397 A1 * | 1/2003 | Chanu ............................ 700/17 |
| 2004/0031673 A1 * | 2/2004 | Levy .............................. 200/521 |
| 2005/0099394 A1 * | 5/2005 | Chou et al. .................... 345/168 |
| 2005/0221867 A1 * | 10/2005 | Zurek et al. ................. 455/569.1 |

FOREIGN PATENT DOCUMENTS

| CN | 01232215 | 9/2002 |
| FR | 1562311 | 4/1969 |
| JP | 11-126126 | 11/1999 |

(Continued)

OTHER PUBLICATIONS

Tyborski, Michael A.; "Joysticks for the Commodore 64"; Compute; Issue 37/Jun. 1983/2 Pages.

*Primary Examiner* — Shaheda Abdin (57) ABSTRACT

An interface, apparatus, circuit and method for interfacing with an electronic device, such as a cellular telephone, are disclosed. The interface includes a key pad with a number of keys, each operable for providing a unique input to the electronic device, and a actuator for selectively actuating one or more of the keys. A controller, coupled to the key pad, scans the keys according to a mode of operation of the electronic device. A mode selector, operable with the controller, selects a first or second operating mode. In the first, useful for instance in performing telephonic functions, each key provides its unique input discretely. In the second mode, useful for instance for providing a game related function, certain of the keys are selectively chorded to function for providing their respective inputs together, effectively simultaneously, according to a manipulation of the actuator by the user.

24 Claims, 7 Drawing Sheets

(56) References Cited

FOREIGN PATENT DOCUMENTS

| | | |
|---|---|---|
| JP | 2000-032110 | 1/2000 |
| JP | 2003-029902 | 1/2003 |
| JP | 2003-223267 | 8/2003 |
| JP | 2003-338232 | 11/2003 |
| TW | 569125 | 1/2004 |
| TW | 1220494 | 8/2004 |

* cited by examiner (Prior Art)

INTERFACE, CIRCUIT AND METHOD FOR INTERFACING WITH AN ELECTRONIC DEVICE

TECHNICAL FIELD

The present invention relates to the field of interfaces. More specifically, embodiments of the present invention relate to an interface, circuit and method for interfacing with an electronic device.

BACKGROUND

Advances in electronics, software, telecommunications, and other technologies have allowed miniaturization and portability, as well as economical proliferation of a wide variety of modern electronic devices. Such devices include cellular telephones, laptop and other small form factor, lightweight, high capacity computers, personal digital assistants (PDAs), and a variety of others. With their usefulness and economical affordability, some such devices, the cellular (cell) telephone for instance, have become all but ubiquitous. A variety of applications may now be run on modern miniature, portable electronic devices.

A modern cell phone, for instance, besides "simply" functioning as a telephone for voice communications, can allow a user to access and use the Internet, capture and store pictures, perform calculations, store and retrieve memoranda, access, compose, and send text messages, and perform other useful tasks. Modern laptop and similar computers, with high capacity random access memory and flash drives and other features have capabilities comparable to many non-portable computers, and thus may run equivalent, similar, and/or identical applications.

Modern electronic and/or computer based games are quite popular and are useful for entertainment, education, training, developing hand-eye coordination and reflexes, rehabilitation, diversion, relaxation, and other activities. Their usefulness and popularity are such that their users seek to use electronic games anywhere, anytime, in almost any conceivable circumstance. Some such games are deployed in miniaturized, dedicated portable game devices. For these, such use is readily feasible, by their design. For instance, some game controllers are configured to efficiently provide spatial/directional and/or similar input for controlling (e.g., orienting, etc.) game action according to a user's skill, play, etc. For some other devices however, such use, while desirable, may face certain constraints or limitations.

Factors contributing to the popularity of the cell phone devices include portability, anytime usefulness in all manner of places in almost any conceivable circumstance, and more recently, versatility with various applications, including games. Yet, electronic games are best used where the game playing user is in full control of the game application, including the action characterizing the game, and over the gaming device, here e.g., the cell phone, itself. Thus, the user interface is an important component of the game device, impacting on the quality of the gaming experience.

Figure 1:
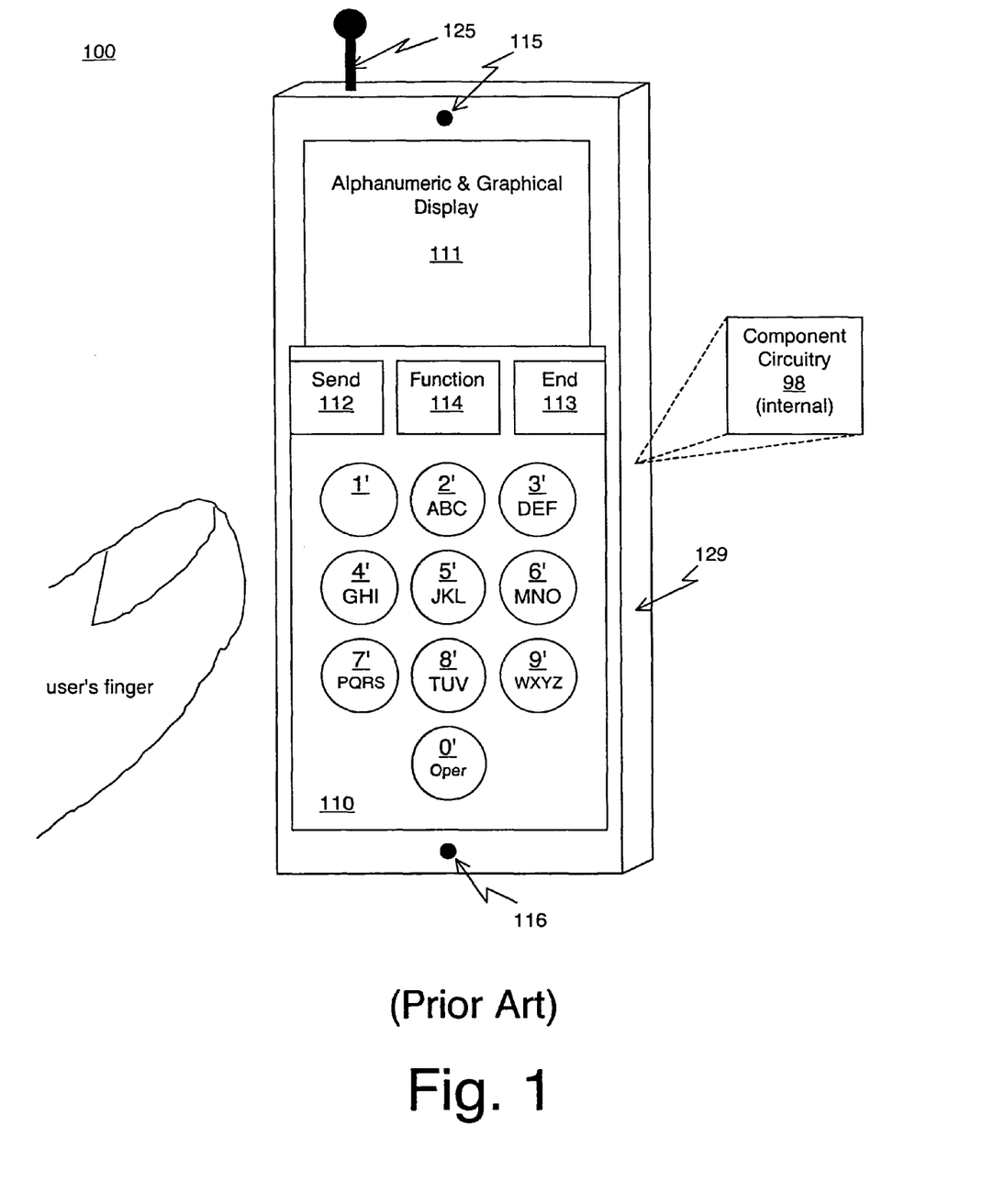
FIG. 1 depicts an exemplary prior art cellular telephone.

However, cell phones are typically designed to optimize portability. Thus, they are typically designed and configured to minimize their size and weight, as well as to be economical to manufacture and procure. A conventional cell phone user interface typically includes a simple keypad. FIG. 1 depicts a typical cell phone 100, having a conventional keypad 110. Cell phone 100 is housed in a plastic case 129 and has speaker 115, which is held near or against a user's ear, and a microphone 116, into which a user speaks. Component circuitry 98 within case 129 provides functionality for cell phone 100.

An antenna 125, which can be retractable (e.g., into the inside of case 129) allows cell phone 100 to function wirelessly. Alphanumeric and graphical information are displayed for a user on display 111, which can be a liquid crystal display device, a cold cathode or thin screen cathode ray tube (CRT) display device, or another small form factor, lightweight, low power consumption display device. Where cell phone 100 is used to provide gaming functionality, graphics for the gaming functionality (e.g., game images) like other information, is displayed to the user on display 111.

Keypad 110 provides an interface for a user to operate cell phone 100. A send key 112 allows a wireless connection to be established, which can be terminated with end key 113. Keys 1'-0' allow a user to input alphanumeric data. A function key 114 provides for changing between functional applications running on cell phone 100 (e.g., on processors and memory comprising internal component circuitry 98), perhaps in conjunction with alphanumeric data input using one or more of keys 1'-0'. This (or e.g., a similar) layout for cell phone 100 accords well with its function as a highly portable telecommunications device.

Notwithstanding whatever capabilities component circuitry 98, function key 114, display 111, and the keys 1'-0' provide however, the layout shown in FIG. 1 for cell phone 100, so typical of many conventional cell phones, while perhaps optimized for its telephone functionality, may not perform a gaming user interface function very well. Some modern cell phones are so compact and portable that the user's fingers may be somewhat large for manipulating the keys of keypad 110 that are active for gaming functions fast enough or accurately enough for efficient gaming data input, which can deter a rewarding gaming experience.

Further, component circuitry 98 typically functions to prevent more than one of alphanumeric input keys 1'-0' from providing input at any one time, so as to optimize the telephonic functionality of cell phone 100. Component circuitry 98 typically also operates to ensure that all of the keys 1'-0' function. For instance, the keys 1'-0' each input their respective denominative numbers, their respective alphabetical characters (if any), and whatever other functionality each key has, according to the design of component circuitry 98. However, both of these features, single key input at any given time and all keys operability, can inhibit the efficient game interface functionality for keypad 110.

For instance, accidental activation of a key can cause an unintended, erroneous game input which can detract from the gaming experience. For instance, activating key 5' where keys 2', 6', 8', or 4' are meant to be activated can result in key 5' providing its input, which constitutes an erroneous or unintentional game data input. Further, the inability to handle input from multiple keys of keys 1'-0' simultaneously can prevent use of multiple keys from certain gaming inputs. For instance, a certain game application may optimally function if keys 2' and 4', 6' and 8', etc., can provide their respective inputs simultaneously.

While these issues are discussed herein with reference to cell phone 100, it should be appreciated by those skilled in the electronic, telephone, gaming, computer, interface, and related arts that the issues are not limited to cell phones. Some of these same issues may also relate to certain PDAs and other devices, including laptop computers, and even desktop computer keyboards. Laptop computer keyboards, for instance, also typically respond to the individual input of single keys at any given time (except e.g., for 'control', 'alternate', 'option', 'shift', and similar function-oriented keys), all keys are active, and built-in interfaces typically include a small trackball and/or a touchpad. These too may not be optimal for gaming and similar applications.

Of course, peripheral hardware such as joysticks can be used to address this issue, but at the cost of portability, because the joystick and/or other peripherals must be carried with the computer, adding weight, using space, and requiring interconnectability. Similarly, the issues relating to cell phones have been addressed by changing the cell phone to be more compatible with gaming applications, such as making the keys larger, for example, so as to make them more quickly manipulable. Obviously however, such a solution works against the portability and other design features of the cell phone that make them so popular.

Conventional approaches to providing interfaces for effectively using gaming type applications with portable electronic devices thus include changing its design in ways that may not be compatible with other inherent features, such as portability. Some such approaches may even detract from the primary design characteristics of the device. Others work with peripheral hardware, which may also be incompatible with the device's design. There are portable electronic devices with designs dedicated to gaming, etc. Such portable gaming devices however typically have limited versatility apart from gaming type applications.

SUMMARY

What is needed is a circuit and/or method for providing an interface that is useful and effective for gaming type applications run on portable electronic devices such as cell phones, PDAs, laptop and other computers, and keyboards. What is also needed is an interface that is useful and effective for gaming type applications for such devices that is seamlessly compatible with other design features of the device. What is further needed is that this seamless compatibility supports a primary design feature of these portable electronic devices.

An interface, apparatus, circuit and method for interfacing with an electronic device are disclosed. The interface provided is useful and effective for gaming type applications run on portable electronic devices such as cell phones, PDAs, laptop and other computers, and on keyboards. The interface is also useful and effective for gaming type applications run on such devices, and is seamlessly compatible with other design features of the device. Further, the seamless compatibility accorded by the interface supports primary design features of these portable electronic devices.

In one embodiment, the interface includes a key pad with a number of keys, each operable for providing a unique input to the electronic device, and a actuator for selectively actuating one or more of the keys. A controller, coupled to the key pad, allows input from the keys according to a mode of operation of the electronic device. A mode selector, operable with the controller, selects a first or second operating mode. In the first operating mode, each key provides its input discretely. In the second operating mode, certain of the keys are selectively chorded to function for providing effectively simultaneous input together, according to user manipulation of the actuator. The first operating mode is beneficial where the electronic device is to provide telephonic and/or other communication and/or networking related functionality. The second operating mode is beneficial where the electronic device is to provide gaming related functionality.

BRIEF DESCRIPTION OF THE DRAWINGS

The figures described herein are not drawn to scale.

DETAILED DESCRIPTION

An interface, apparatus, circuit and method for interfacing with an electronic device are disclosed. Reference is now made in detail to several embodiments of the invention, examples of which are illustrated in the accompanying drawing figures. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, one of ordinary skill in the art will realize that embodiments of the present invention may be practiced without these specific details. In other instances, well-known devices, circuits, methods, processes, procedures, systems, components, and apparatus have not been described in detail so as not to unnecessarily obscure aspects of the present invention.

Portions of the detailed description that follows are presented and discussed in terms of a process. Although steps and sequencing thereof are disclosed in a figure herein (e.g., FIG. 7) describing the operations of this process (e.g., process 7), such steps and sequencing are exemplary. Embodiments of the present invention are well suited to performing various other steps or variations of the steps recited in the flowchart of the figure herein, and in a sequence other than that depicted and described herein. In one embodiment, such a process is carried out by processors and electrical and electronic components under the control of computer readable and computer executable instructions comprising code contained in a computer usable medium.

Embodiments of the present invention provide an interface, apparatus, circuit and method for interfacing with an electronic device. In one embodiment, the interface includes a key pad with a number of keys, each operable for providing a unique input to the electronic device, and an actuator for selectively actuating one or more of the keys. A controller, coupled to the key pad, allows the keys to provide their respective inputs according to a mode of operation of the electronic device. A mode selector, operable with the controller, selects a first or second operating mode. In the first, each key provides its input discretely. In the second, certain of the keys are selectively chorded to function for providing their input effectively simultaneous together, according to a manipulation of the actuator by the user.

Therefore, an interface is provided that is useful and effective for gaming type applications run on portable electronic devices such as cell phones, PDAs, laptop and other computers, and keyboards. The interface is seamlessly compatible with other design features of the device. In fact, the interface seamlessly supports primary design features of these portable electronic devices.

Exemplary Key Pad Apparatus

Figure 2:
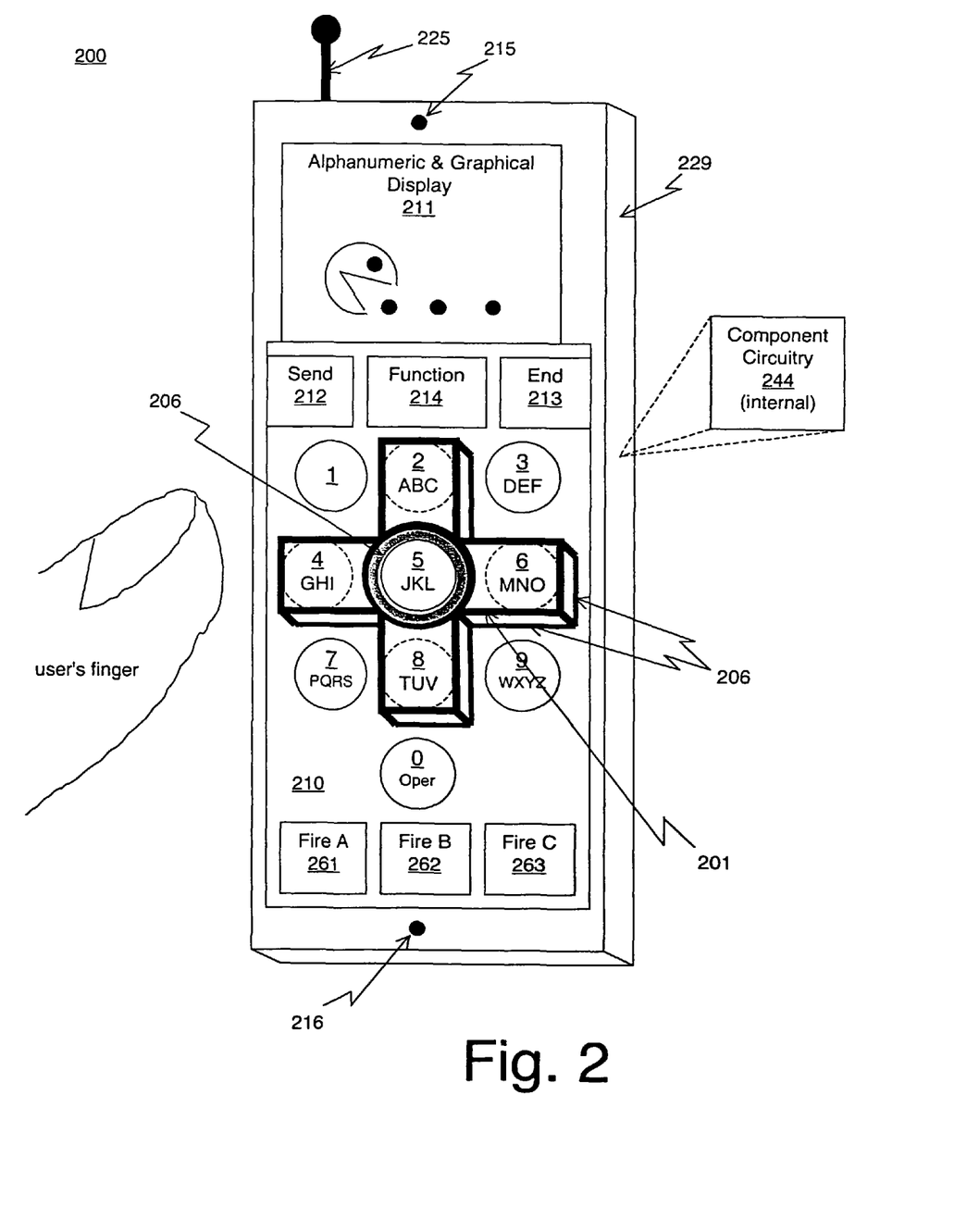
FIG. 2 depicts an exemplary key pad apparatus (from an exterior perspective) deployed on a cellular telephone, according to an embodiment of the present invention.

FIG. 2 depicts an exemplary key pad apparatus 210 deployed on a cell phone 200, according to an embodiment of the present invention. Cell phone 200 is housed in a plastic case 229 and may have a speaker 215, which may be held or positioned near or against a user's ear, and a microphone 216, into which a user speaks. Component circuitry 244 within case 229 provides functionality for cell phone 200. In one embodiment, component circuitry provides such functionality with software.

An antenna 225, which can be retractable (e.g., into the inside of case 229) allows cell phone 200 to function wirelessly. Alphanumeric and graphical information is displayed for a user on display 211, which can be of any design, e.g., a liquid crystal display device, a cold cathode or thin screen CRT display device, or another small form factor, lightweight, low power consumption display device, etc. Where cell phone 200 is used to provide gaming functionality, graphics for the gaming functionality, such as game images, like other information, are displayed to the user on display 211.

Keypad 210 provides interface functionality to allow a user to operate cell phone 200. A send key 212 allows a wireless connection to be established, which can be terminated with end key 213. Keys 1-0 allow a user to input alphanumeric data. A function key 214 provides for changing between functional applications running on cell phone 200, perhaps in conjunction with alphanumeric data input using one or more of keys 1-0. Keys 1-0 allow alphanumeric input to dial telephone numbers, specify a uniform resource locator (URL), input a text message (e.g., email) and perform similar tasks that allow.

Such tasks allow cell phone 200 to be used as a versatile portable communications device. They enable, for instance, standard telephonic functionality as well as networking capability, such as the ability to receive and display Web pages from the Internet, to display, send and receive email and similar text-based messages, and similar functions. Cell phone 200 however further provides for an interface that is useful and effective for running gaming type applications. Keypad 210 includes an actuator device 201, which allows user input corresponding to this interface.

In one embodiment, actuator device 201 has a substantially cruciform (e.g., cross shaped, +shaped, etc.) aspect that effectively protrudes from a substantially flat surface of the keypad. It should be appreciated that, while the surface of keypad 210 in this embodiment is discussed in terms of being substantially flat, its contour may in fact be slightly curved, for instance, as cell phone 200 may be designed to ergonomically fit into the palm of a user's hand. Actuator device 201 has edges 206 where its substantially cruciform members or other parts protrude from the surface of keypad 210.

Keys 2, 6, 8, and 4 are actuated by the upper, right, lower, and left sections of actuator device 201, respectively. A space 206, substantially in the center of actuator device 201, e.g., between its upper, lower, left, and right cruciform sections that span keys 2, 8, 4, and 8, respectively, separates key 5 from actuator device 201. In one embodiment, key 5 is slightly recessed within space 206. Keys 1, 3, 5, 7, 9, and 0 are not actuated by actuator device 201. In one embodiment, keys 2, 4, 6, and 8 are a part of actuator device 201. In one embodiment, these keys are below actuator device 201 and are actuated therewith. In one embodiment, actuator device 210 is transparent, allowing the keys 2, 4, 6 and 8 to be viewed through it.

Within the area of keypad 210 (or at another position on cell phone 200, such as a bottom or side edge of case 229), fire keys 261-263 provide various functionality related to the game or similar application. While fire keys 261-263 here illustrate three fire keys A-B, respectively, it should be appreciated that any other number of fire keys, arranged in any configuration, may be used. In one embodiment, where cell phone 200 functions in a telecommunications device mode, the fire keys 261-263 do not function. In another embodiment, these keys have communications related functionality.

Where cell phone 200 functions as a telecommunications device, for instance in its telephone mode, its Web browsing mode, or its text messaging mode, keys 1-0 function as they do on a typical cell phone. Keys 1, 3, 5, 7, 9, and 0 are actuated by touching, depressing, or otherwise physically triggering them directly. Actuator device 201 actuates keys 2, 6, 8, and 4. During such telecommunicative and/or networking functioning, keys 1-0 each provide their individual inputs discretely. For instance, component circuitry 244 functions in such operating modes to prevent more than one of keys 1-0 from providing their inputs at the same time.

However, where cell phone 200 functions using the actuator device 201 as an interface device to perform a gaming related or similar application, the interface provided with actuator device 201 allows several of the keys it actuates to provide their inputs effectively simultaneously, e.g., to be chorded. For instance, component circuitry 244 functions in a game-related or similar operating (e.g., gaming) mode to allow more than one of keys 2, 4, 6, and 8, those chorded with actuator device 201, to be actuated at the same time. Importantly, such chording capability allows interfacing that can be beneficial in gaming related and similar applications. For instance, to efficiently provide directional/directional and/or similar input for controlling, orienting, etc., action in game, e.g., according to a user's skill, play, etc. in manipulating actuator device 201 to interface with the game application.

While providing such game related functionality (e.g., while operating in a game mode) allows chording of certain keys, cell phone 200 also operates in one embodiment to selectively deactivate certain keys (e.g., any or all of keys 1, 3, 5, 7, 9, and/or 0). Further, cell phone 200 allows any or all of keys 1-0 (e.g., keys 2, 4, 6, and/or 8) to provide their individual inputs discretely, when operated (e.g., actuated, etc.) individually. For instance, while keys 2 and 6, 6 and 8, 8 and 4, and/or 4 and 2 can be chorded in the game mode when actuated together by actuator device 201, keys 2, 4, 6, and/or 8 can also be actuated individually (e.g., separately from keys 4 or 6 and/or 2 or 8) therewith in the game mode, e.g., without operating another key with which it can be chorded.

Beneficial and versatile game interface capability is provided by allowing chording of certain keys, while allowing these keys to be discretely operated as well, and/or with selective deactivation of certain other keys and/or discrete operation thereof or of others. In one embodiment, with cell phone 200 in a game mode, a game can be played. In such play, the action displayed on display monitor 211 can be provided with spatial movement and/or orientation through a gaming functionality provided by component circuitry 244 (e.g., with appropriate software) by manipulating certain keys in a particular manner.

For instance, action (e.g., movement, direction in a spatial direction, etc.) can be directed "upward" with respect to display 211 (e.g., towards the top of display 211, "away" from the user, etc.) with actuator device 201 actuating the 2 key individually, e.g., to provide a discrete input therewith. Similarly, action can be directed to the user's right, downward, and/or to the user's left with actuator device 201 actuating the 4, 6, and/or 8 keys individually, e.g., to provide a discrete input therefrom.

Further, keys 4 and 2 can be chorded, e.g., actuated effectively simultaneously with actuator device 201, to direct such action diagonally upward and to the user's left. Similarly, keys 2 and 6, 6 and 8, 8 and 4, and/or 4 and 2 can be chorded to respectively with actuator device 201 to direct such action diagonally upward and to the user's right, diagonally downward and to the user's right, and/or diagonally downward and to the user's left.

Thus, chording certain keys according to one embodiment of the present invention effectively provides a distinct input signal, e.g., distinct from the individual input signal provided by discrete actuation of these keys. Advantageously, this extends the number and usefulness of input signals available to a user of cell phone 200. For instance, when keys 1-0 operate only discretely, key pad 210 provides only ten available, individual inputs (e.g., without extending key functionality with function key 214, etc.) However, chording certain of keys 1-0 according to an embodiment of the present invention allows keypad 210 to provide fourteen available, individual inputs (e.g., which may also be made extensible).

Actuator device 201 also deters inadvertent key operation. For instance, the 5 key is ensconced within space 206, which in one embodiment forms an effectively annular depression or open space into which the 5 key is recessed. Such ensconcement deters inadvertent actuation of key 5 by a user of actuator device 201. In one embodiment, keys 1, 3, 5, 7, 9, and 0, or various selections from among these keys, are deactivated during the gaming mode. In one embodiment, keys 1, 3, 5, 7, 9, and 0, or various selections from among these keys, provide their respective inputs discretely during the gaming mode. Actuator device 201 functions selectively in one embodiment.

Figure 3:
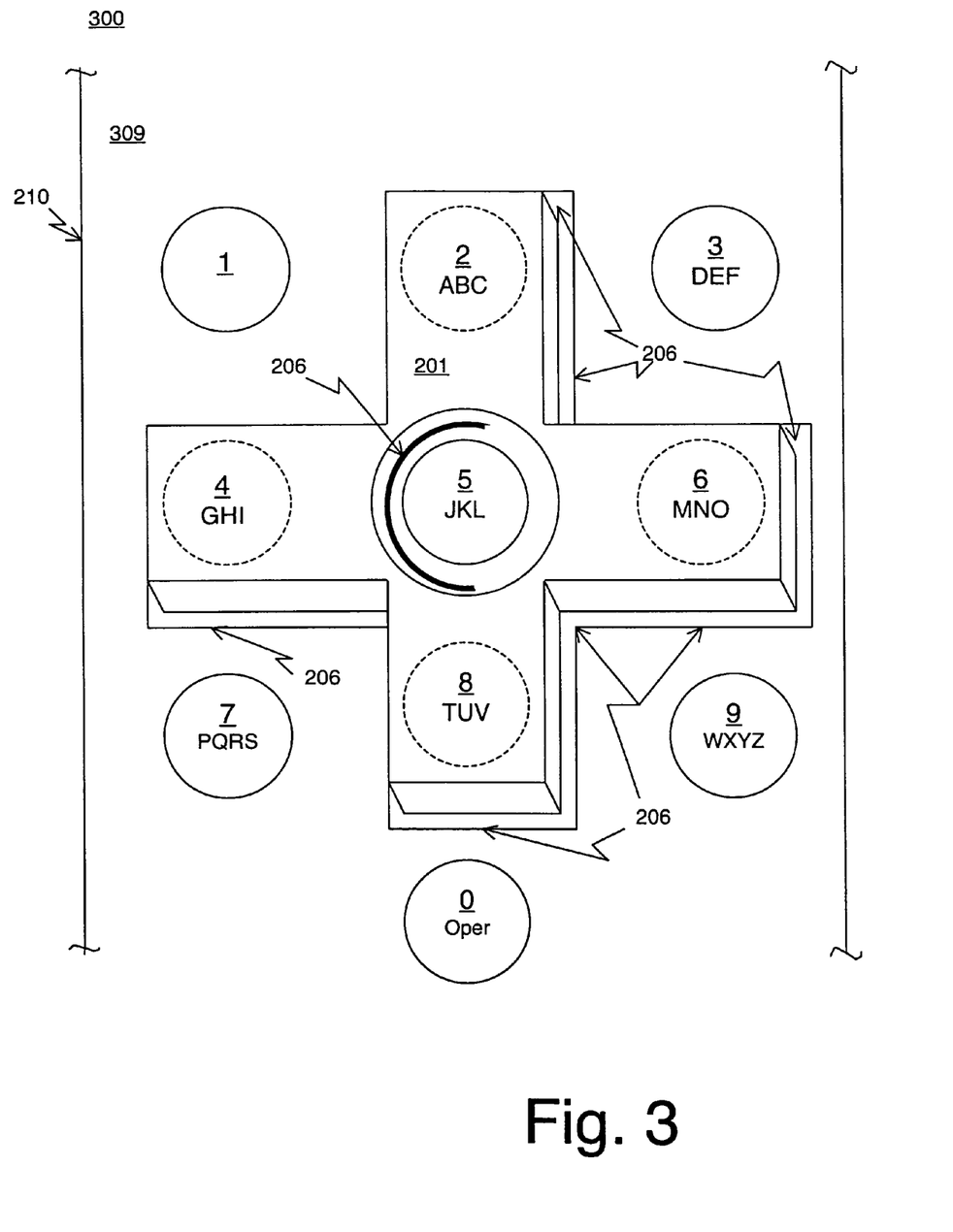
FIG. 3 depicts an exemplary key pad apparatus (from an exterior perspective), according to an embodiment of the present invention.

FIG. 3 depicts a section 300 of exemplary keypad 210, from an upper, exterior perspective, in somewhat more detail than depicted in FIG. 2 (FIGS. 2 and 3 are not drawn to scale). Keypad 210 has a face 309, which has an essentially cruciformly configured space 206 effectively centered within its area. Cruciformly configured space 206 has dimensions sufficient to accommodate actuator device 201, such that the device can move without significant vertical restriction there through. In one embodiment, space 206 is flexibly and protectively sealed. In one embodiment, actuator device is removably coupled to keypad 210. Advantageously, this allows actuator device to be removed when not being used, e.g., for providing a gaming interface, etc., and/or to be added to the cell phone 200.

Figure 4:
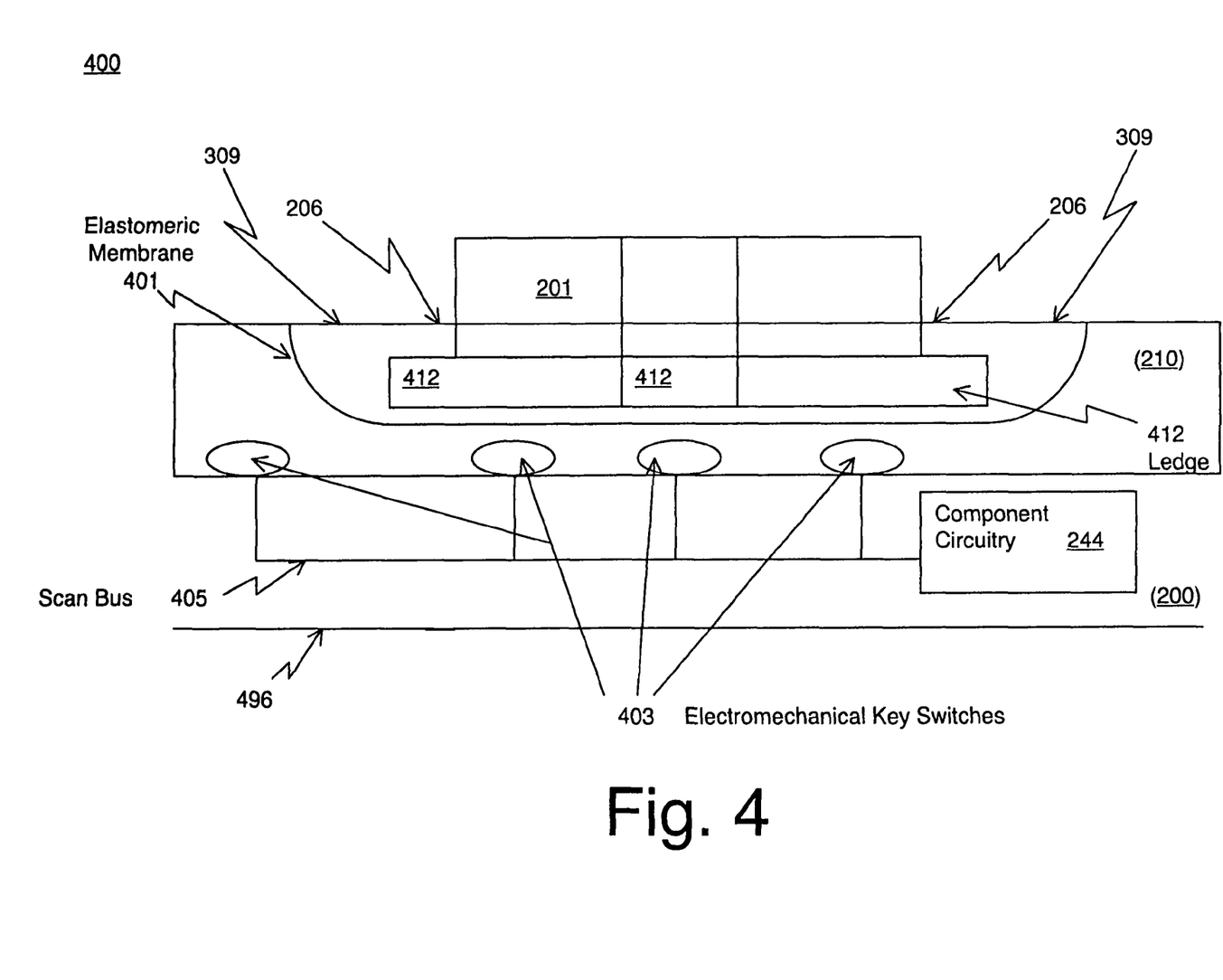
FIG. 4 depicts an exemplary key pad apparatus (with an interior perspective), according to an embodiment of the present invention.

FIG. 4 depicts a cross-section 400 of exemplary keypad 210, from a side, interior perspective. FIG. 4 depicts cross-section 400 in about a similar degree of detail as depicted in FIG. 3; however, FIGS. 3 and 4 are not drawn to scale. Keypad 210 has a face 309, which has an essentially cruciformly configured space 206 effectively centered within its area. Cruciformly configured space 206 has dimensions sufficient to accommodate actuator device 201, such that the device can move without significant vertical restriction there through. In one embodiment, space 206 is flexibly and protectively sealed.

Actuator device 201 has a ledge 412 about its lower horizontal surface that is below face 309, essentially internal to the cell phone 200. Ledge 412 skirts the cruciform lower contour of actuator device 201. In one embodiment, actuator device 201 and ledge 412 are of essentially one piece construction of any suitable material, such as plastic. An elastomeric pad (e.g., membrane, sheet, etc.) 401 is affixed to the lower surface of face 309. Elastomeric pad 401 places upward pressure against device 201 to hold ledge 412 it in situ against the lower surface of face 309. Yet, ledge 412 effectively prevents actuator device 201 from being ejected through space 206.

Key switches 403 are actuated with associated keys (e.g., keys 1-0; FIGS. 2, 3). Actuator device 201 actuates the switches 403 that correspond to keys 2, 4, 6, and 8 (FIGS. 2, 3) according to corresponding user action thereon. Key switches 403 are connected to component circuitry 244 by a key stroke bus 405, via which encoding and decoding key input signals transverse. Key switches 403 are internal to cell phone 200, which has a bottom surface 496. In one embodiment, those of key switches 403 that are actuated with actuator device 201 can be chorded in a gaming related operating mode; others can remain discrete or are deactivated.

Exemplary Circuit

Figure 5:
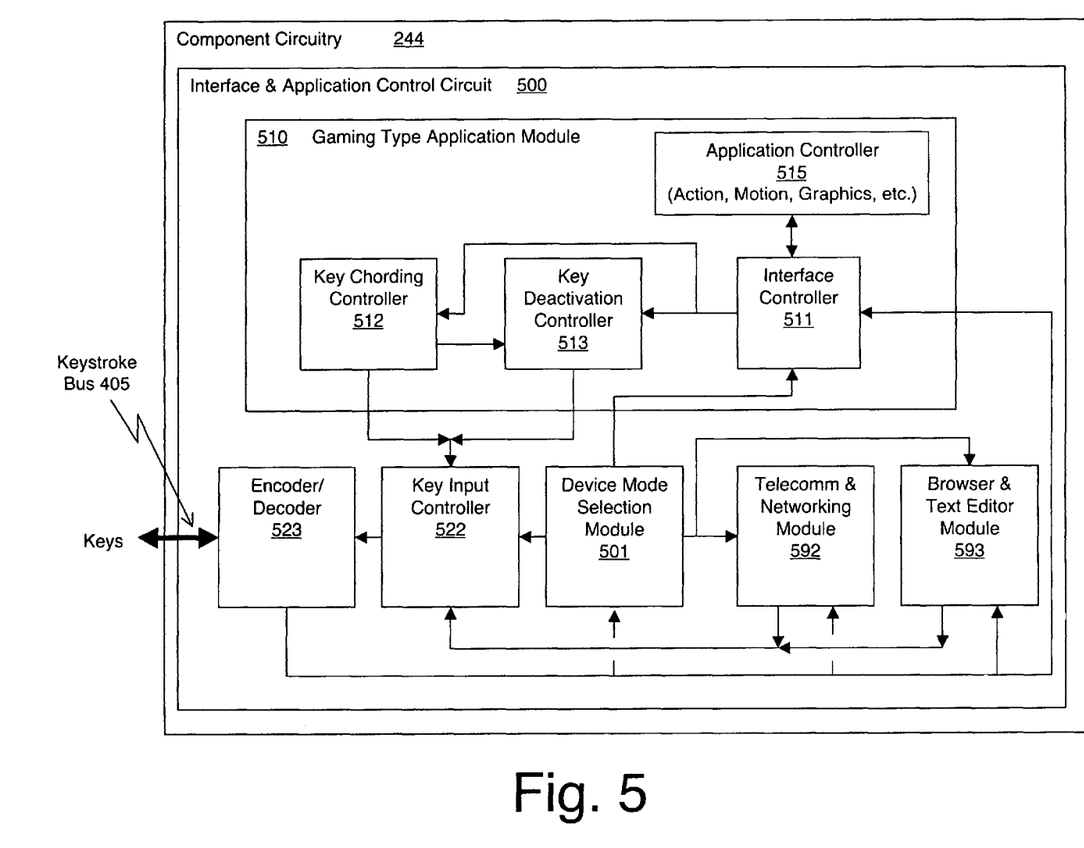
FIG. 5 depicts an exemplary circuit for activating a key pad interface with an electronic device, according to an embodiment of the present invention.

FIG. 5 depicts an exemplary circuit 500 for activating a key pad interface with a portable electronic device, according to an embodiment of the present invention. In one embodiment, circuit 500 comprises part of component circuitry 244, and functions therein to provide control for applications and related interfaces. Circuit 500 operates to allow chording of certain keys of a key based interface (e.g., key pad 210; FIGS. 2, 3, 4), while deactivating certain others and/or restricting certain others to providing their respective inputs discretely, during one operating mode of a device such as a cell phone (e.g., cell phone 200; FIGS. 2, 3, 4). In another operating mode, circuit 500 allows the keys of the interface to be provide their inputs discretely.

Advantageously, circuit 500 thus enables an interface (e.g., actuator device 201; FIGS. 2, 3, 4) that is effective for gaming and related applications, wherein certain keys are chorded therewith. This allows a cell phone or another portable electronic device in which it is deployed to function effectively in a gaming application operating mode. In this operating mode, the device allows a user to, for instance, effectively play a computer based game thereon or perform similar useful activity.

However, circuit 500 further enables the interface to function effectively in an operating mode other than the gaming application operating mode, wherein keys provide their respective inputs discretely. Thus, circuit 500 allows a device such as cell phone 200 to perform other useful functions, for instance, in a telephone and networking (e.g., communications) operating mode, a Web browser and text editor (e.g., text based) operating mode, etc.

In one embodiment, circuit 500 comprises discrete electronic components. In one embodiment, circuit 500 is configured within component circuitry 244. In one such embodiment, circuit 500 is programmably configured. In one embodiment, components of circuit 500 described below are effectuated by, for instance a processor or an application specific integrated circuit (ASIC), under control of computer usable code within a computer readable medium.

Circuit 500 has an encoder/decoder 523 that accepts input from keys of the key based interface via key input (e.g., keystroke) bus 405 to allow user input. Responsive to an appropriate such user input, a device mode selection module 501 allows the device to enter a particular operating mode.

A communications related operating mode allows the device to function as a telephone and/or to perform networking operations. In this communications related operating mode, telecommunications and networking module 592 is selected by device mode selection module 501 to control key input controller 522. In accordance with such control, key input controller 522 allows encoder/decoder 523 to take input from keys (e.g., keys 1-0; FIGS. 2, 3) discretely, e.g., from one individual key at a time.

Telecommunications and networking module 592 can perform functions related to a text related application, such as Web browsing, text editing, etc., or another application. In one embodiment, functions relating to text related applications are performed by a browser and text editor module 593. In this embodiment, browser/editor module 593 is selected by device mode selection module 501 to control key input controller 522. In accordance with such control, key input controller 522 allows encoder/decoder to take input from each of the keys discretely.

A game type application module 510 supports the operating mode related to gaming or similar applications (e.g., gaming mode), in which chording of certain keys and selective disabling of another and/or selective discrete actuation of certain others are beneficial. In the gaming mode, device mode selection module 501 selects gaming type application module 510 to control key input controller 522 to allow such chording and selective disablement and/or selective discrete key inputs.

In one embodiment, device mode selection module 501 selects game type application module 510 with an appropriate input to interface controller 511 therein. In gaming mode, interface controller 511 provides an input to key chording controller 512. Responsive to this input, key chording controller 512 controls key input controller 522 to allow chording of certain keys (e.g., keys 2-6, 6-8, 8-4, 4-2; FIGS. 2, 3). Also responsive to the input, key chording controller 512 controls key deactivation controller 523 to selectively disable and/or selectively take discrete input from certain other keys (e.g., keys 1, 3, 5, 7, 9, 0; FIGS. 2, 3).

Direct user action with a key is achieved in one embodiment via key input bus 405 and encoder/decoder 523, which provides input corresponding to the user action to interface controller 511. Responsive to this input, interface controller provides game related data to application controller 515, which controls other aspects relating to the gaming application (e.g., graphics, motion, sound, action, etc.) accordingly, for instance, with another feature of component circuitry 244 that provides control over a display (e.g., display 211; FIG. 2).

In one embodiment, the functionality provided by circuit 500, described above, is achieved with software control (e.g., achieved with a computer readable medium having code therein for controlling a computer system such as can comprise circuitry 244 to perform a process for activating the keypad interface). In one embodiment, software control functions with elements of circuit 500 for activating a key pad interface of a portable electronic device. In an alternative embodiment, a key pad interface of a portable electronic device is activated entirely under software control.

Exemplary Interface

Figure 6:
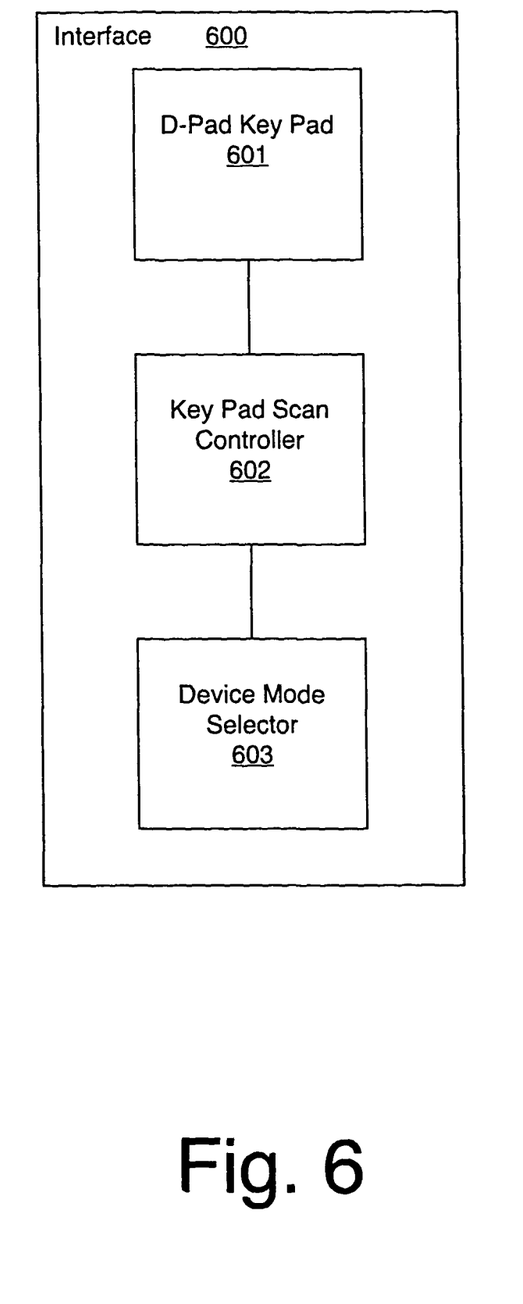
FIG. 6 depicts an exemplary interface for an electronic device, according to an embodiment of the present invention.

FIG. 6 depicts an exemplary interface for an electronic device 600, according to an embodiment of the present invention. In the following description, it will be appreciated that interface 600 is configurable with apparatus and circuits such as those described above, with reference to FIGS. 2, 3, 4, and/or 5. The electronic device can be a useful portable communications, computing, or other device. For instance, embodiments of the present invention can relate to, for instance, a cell phone, a PDA, a laptop computer, a computer keyboard, etc.

Interface 600 comprises a key pad 601. Key pad 601 has multiple keys, each of which is user operable for providing a unique input to the electronic device. A selective actuator (e.g., actuator device 201; FIGS. 2, 3), coupled to key pad 601, selectively actuates one or more keys of the multiple keys.

A key input controller, coupled (e.g., electrically), to the key pad, allows input from single or certain multiple keys according to a mode of operation of the electronic device (e.g., communicative, networking, game playing, editing, etc.). A mode selector, coupled to the key input controller, selects from at least two operating modes. In a first operating mode such as can correspond e.g., to telephonic or other communication and/or networking related activity, each of the multiple keys provides its input discretely.

In a second operating mode such as can correspond to gaming related activity, certain of the multiple keys are selectively chorded to function for effectively simultaneous input together, according to a user manipulating the selective actuator (certain of the other keys may be selectively deactivated and/or provide their input discretely). Selective chording allows unique input from multiple keys distinguishable from their individual input. This provides an effective interface, beneficial for instance where the second operating mode relates to running a gaming type application, and/or where the electronic device is, for instance, a cellular telephone.

Exemplary Process

Figure 7:
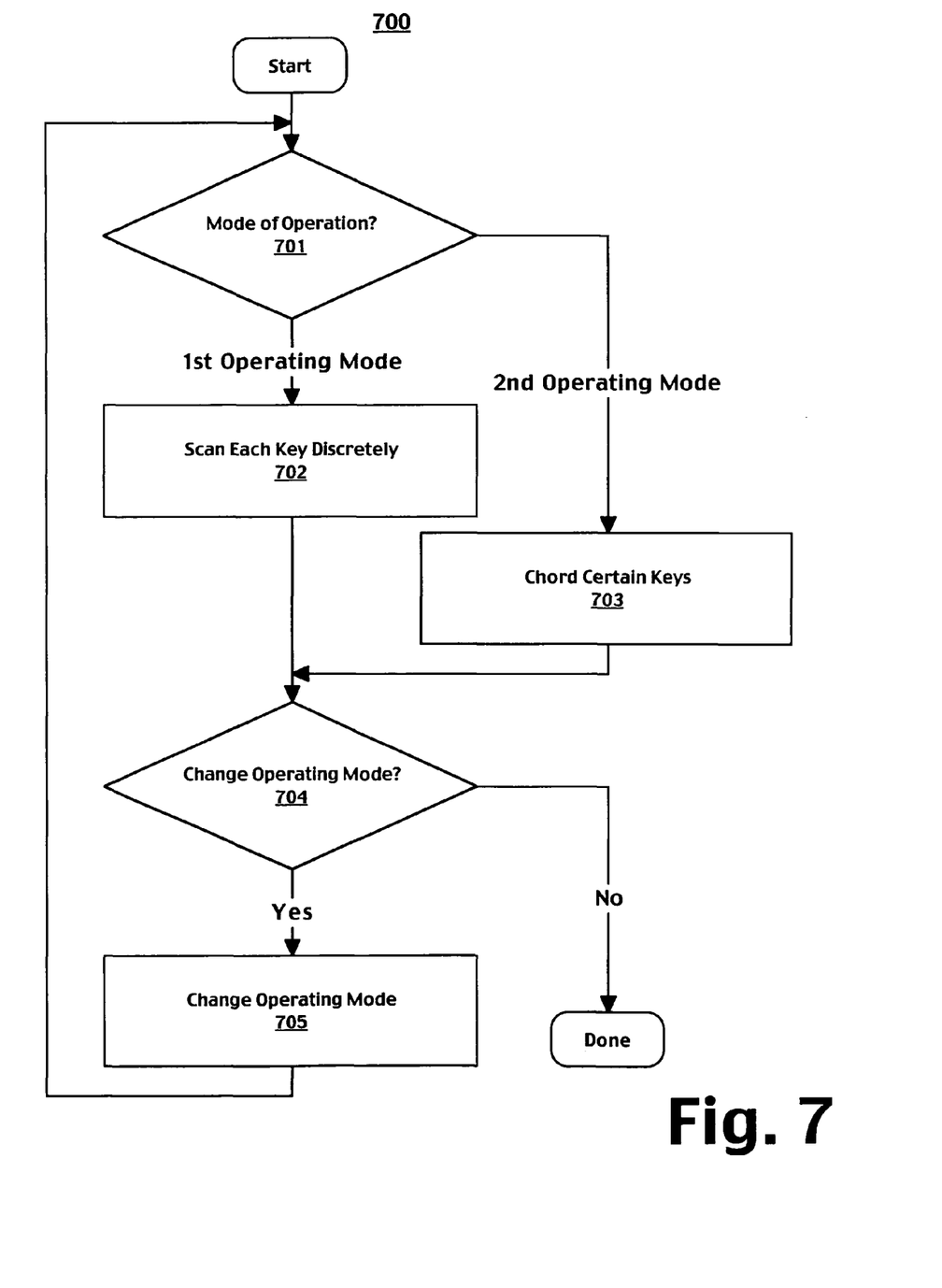
FIG. 7 is a flowchart of an exemplary process for activating a key pad interface with a portable electronic device, according to an embodiment of the present invention.

FIG. 7 is a flowchart of an exemplary process 700 for activating a key pad interface with a portable electronic device, according to an embodiment of the present invention. In the following description, it will be appreciated that process 700 can be implemented with apparatus and circuits such as those described above, with reference to FIG. 6.

Process 700 begins with step 701, wherein selecting a mode of operation is selected for the electronic device from two or more operating modes. Where one operating mode is selected, for instance where a cell phone is configured to function as a telecommunication and/or networking device, and upon a user's input thereto, in step 702, each of the several keys on the key pad provide their individual inputs discretely.

Each of these multiple keys is user operable for providing a unique input to the electronic device. Where a second operating mode is selected, such as where the cell phone is configured to function to run a game related application, in step 703 certain of the multiple keys are selectively chorded, such that certain keys provide their inputs effectively simultaneously. Certain other of the keys may selectively be deactivated and/or provide their respective inputs discretely while in the second operating mode.

In step 704, it is determined whether a change in the operating mode is desired. If not, process 700 may be complete. Where it is determined that a change in the operating mode is desired, then in step 705, the user changes the operating mode, and process 700 loops back to repeat step 701.

In summary, an interface, an apparatus, a circuit, and a method for interfacing with an electronic device includes a key pad with multiple keys, each operable for providing a unique input to the electronic device. An actuator coupled to the key pad selectively actuates one or more of the keys. A controller, coupled to the key pad, allows the keys to provide their respective inputs according to a mode of operation of the electronic device. A mode selector, operable with the controller, selects a first or second operating mode. In the first operating mode, each key provides its input discretely. In the second operating mode, certain of the keys are selectively chorded to function for providing their respective inputs effectively simultaneous together, according to a manipulation of the actuator by the user.

Embodiments of the present invention described above thus relate to an interface, an apparatus, a circuit, and a method for interfacing with an electronic device. While the present invention has been described in particular exemplary embodiments, the present invention should not be construed as limited by such embodiments, but rather construed according to the following claims and their equivalents.

What is claimed is:

1. A user interface for an electronic device, comprising:
a key pad having a plurality of keys including keys 1-0;
a selective actuator coupled to said key pad for selectively actuating a plurality of said keys 1-0;
a key controller, for allowing input to said electronic device from each of said plurality of keys according to a mode of operation of said electronic device; and
a mode selector coupled to said key controller, for selecting said mode of operation wherein, each key of said plurality of keys provides an input discretely to effectively prevent simultaneous input together in response to manipulation of said selective actuator in a first mode and wherein, certain keys of said plurality of keys 1-0 are selectively chorded and effectively provide a simultaneously input together in response to manipulation of said selective actuator in a second mode.

2. The user interface as recited in claim 1 wherein said second mode relates to running a gaming type application.

3. The user interface as recited in claim 1 wherein said electronic device comprises a cellular telephone.

4. The user interface as recited in claim 1 wherein said key pad arranges said keys 1-0 in an array according to the cardinal value of each said whole number beginning at one (1), continuing through nine (9) in sequence, and ending in zero (0).

5. The user interface as recited in claim 4 wherein said certain keys comprise keys corresponding to the numbers two (2), four (4), six (6), and eight (8).

6. The user interface as recited in claim 5 wherein said selective actuator comprises a substantially cruciform shaped object, comprising four arms, that effectively protrude from a surface of said key pad, and wherein said certain keys corresponding to the numbers two (2), four (4), six (6), and eight (8) are positioned within said key pad to each be actuated by one of said four arms.

7. The user interface as recited in claim 6 wherein said substantially cruciform shaped object has a substantially annular space effectively centered between said four arms and surrounding the key corresponding to the number five (5) and wherein said key corresponding to the number five (5) is effectively protected from inadvertent actuation during said second mode of operation.

8. The user interface as recited in claim 5 wherein keys corresponding to the numbers one (1), three (3), five (5), seven (7), nine (9), and zero (0) are selectively deactivated during said second mode and perform a discrete input during said first mode.

9. An apparatus for allowing a user to interface with an electronic device, comprising:
a key pad assembly comprising a plurality of numbered keys, each key of said key pad operable by said user for providing a unique input to said electronic device, said numbered keys arranged in an array according to each number;
a selective key actuation component coupled to said key pad assembly and effectively protruding from a surface thereof, for selectively actuating one or more numbered keys of said key pad; and
a controller operable in a first mode wherein each key of said key pad performs a discrete input function of said electronic device to effectively prevent simultaneous input together and a second mode wherein certain pairs of said numbered keys perform an effectively simultaneously input function of said electronic device together according to manipulation of said actuation component.

10. The apparatus as recited in claim 9 wherein said second mode relates to running a gaming type application.

11. The apparatus as recited in claim 9 wherein said electronic device comprises a cellular telephone.

12. The apparatus as recited in claim 9 wherein said certain keys comprise keys corresponding to the numbers two (2), four (4), six (6), and eight (8).

13. The apparatus as recited in claim 12 further comprising an elastomeric sheet affixed to a face of a surface internal to said electronic device, wherein said selective key actuation component comprises a ledge substantially surrounding its lower portion, wherein said elastomeric sheet functions to allow said selective key actuation component to actuate said certain keys and to hold said selective key actuation component against said face of said surface internal to said electronic device.

14. The apparatus as recited in claim 13 wherein said selective key actuation component has a substantially cruciform contour, wherein said key pad assembly has dimensions sufficient to accommodate vertical displacement of said selective key actuation component, and wherein said certain keys corresponding to the numbers two (2), four (4), six (6), and eight (8) are positioned within said key pad so as to each be actuated by one of four arms of said selective key actuation component.

15. The apparatus as recited in claim 14 wherein said selective key actuation component further comprises a substantially annular space effectively centered between said four arms and surrounding the key corresponding to the number five (5) and wherein said key corresponding to the number five (5) is effectively protected from inadvertent actuation during said second mode.

16. The apparatus as recited in claim 9 wherein keys corresponding to the numbers one (1), three (3), five (5), seven (7), nine (9), and zero (0) are selectively deactivated and perform a discrete input function during said second mode.

17. A circuit for allowing a user to interface with an electronic device having a key pad, comprising:
a mode selecting module for selecting between a first and second operating modes, wherein in said first operating mode each key of a plurality of keys on said key pad performs a discrete input function of said electronic device to effectively prevent simultaneous input, and wherein each of said keys is further operable by a user for providing a unique input to said electronic device; and
a chording controller enabled by said mode selecting module in said second operating mode to selectively chord certain pairs of numbered keys of said plurality of keys wherein said certain pairs of keys perform an effectively simultaneous input function of said electronic device together.

18. The circuit as recited in claim 17 further comprising a key deactivation controller enabled by said mode selecting module in said second operating mode to selectively deactivate a key and allow said key to perform a discrete input function during said second operating mode.

19. The circuit as recited in claim 17 wherein said second operating mode relates to running a gaming type application.

20. The circuit as recited in claim 17 wherein said electronic device comprises a cellular telephone.

21. A method for allowing a user to interface with an electronic device having a key pad, comprising:

selecting a mode of operation for said electronic device from a plurality of operating modes wherein, in a first operating mode, each key of a plurality of keys on said key pad performs a discrete input function of said electronic device to effectively prevent simultaneous input together, and wherein each of said keys is operable by said user for providing a unique input to said electronic device and wherein in a second operating mode certain keys perform an effectively simultaneous input function of said electronic device together; and selectively chording pairs of keys 1-0 of said plurality of keys wherein said pairs of keys 1-0 perform said effectively simultaneous input function together.

22. The method as recited in claim 21 further comprising, during said second operating mode, selectively:

deactivating a key; and allowing said key to perform a discrete input function.

23. The method as recited in claim 21 wherein said second operating mode relates to running a gaming type application.

24. The method as recited in claim 21 wherein said electronic device comprises a cellular telephone.

\* \* \* \* \*